(12) United States Patent
Faes

(10) Patent No.: US 6,578,696 B2
(45) Date of Patent: Jun. 17, 2003

(54) COIN ESCROW MECHANISM

(75) Inventor: Steven M. Faes, Canisteo, NY (US)

(73) Assignee: British Telecommunications public limited company, London (GB)

( * ) Notice: Subject to any disclaimer, the term of this patent is extended or adjusted under 35 U.S.C. 154(b) by 131 days.

(21) Appl. No.: 09/794,204

(22) Filed: Feb. 27, 2001

(65) Prior Publication Data

US 2002/0007998 A1 Jan. 24, 2002

Related U.S. Application Data (60) Provisional application No. 60/185,911, filed on Feb. 29, 2000.

(51) Int. Cl.[7] .............................. G07F 1/04; G07F 5/02
(52) U.S. Cl. ..................... 194/346; 194/229; 194/351
(58) Field of Search ................................ 194/346, 344, 194/229, 350, 351, 233, 235; 193/31 R, 31 A, 32, DIG. 1

(56) References Cited

U.S. PATENT DOCUMENTS

| | | |
|---|---|---|
| 751,081 A | 2/1904 | Larned |
| 886,499 A | 5/1908 | Harrison |
| 1,098,673 A | 6/1914 | Lyng |
| 1,360,677 A | 11/1920 | Perry |
| 2,121,971 A | 6/1938 | Landreth |
| 2,641,348 A * | 6/1953 | Thompson, Jr. ............ 194/229 |
| 2,952,348 A | 9/1960 | Buchholz et al. |
| 3,177,290 A | 4/1965 | Norling et al. |
| 3,464,530 A * | 9/1969 | Knickerbocker ............ 194/233 |
| 3,503,482 A * | 3/1970 | Davis ........................ 194/233 |
| 3,699,259 A | 10/1972 | Main et al. |
| 3,759,441 A | 9/1973 | Hamilton et al. |
| 3,884,330 A * | 5/1975 | Chalabian ................... 194/233 |
| 4,030,586 A * | 6/1977 | Etes .......................... 194/237 |
| 4,550,819 A * | 11/1985 | Smith ........................ 194/218 |
| 4,579,215 A * | 4/1986 | Medley, III ................ 194/233 |
| 4,630,624 A | 12/1986 | Turner |
| 4,782,937 A | 11/1988 | Chen et al. |
| 5,924,543 A | 7/1999 | Faes et al. |
| 6,163,603 A | 12/2000 | McGinty et al. |
| 2002/0050438 A1 * | 5/2002 | Faes et al. .................. 194/207 |

FOREIGN PATENT DOCUMENTS

| | | | |
|---|---|---|---|
| AU | 242397 | 5/1961 | |
| CA | 796993 | 10/1968 | |
| DE | 3727724 A1 * | 3/1988 | ............. G07F/5/06 |

* cited by examiner

*Primary Examiner*—Donald P. Walsh
*Assistant Examiner*—Mark J Beauchaine
(74) *Attorney, Agent, or Firm*—Nixon & Vanderhye P.C.

(57) ABSTRACT

A coin escrow apparatus for use with a pay telephone includes a frame defining accept and reject coin paths, and including a toggle mechanism for the temporary storage of coins independent of coin size and thickness, a coin accept gate mechanism, a coin release gate mechanism that allows coins to be either refunded or cashed out, a cash and/or refund gate mechanism, a coin reject path, a foreign object return path, and a coin deposit path. The toggle mechanism includes pairs of toggles that pivot to selectively block the coin accept path.

13 Claims, 7 Drawing Sheets

COIN ESCROW MECHANISM

CROSS REFERENCE TO RELATED APPLICATIONS

The present non-provisional patent application claims the priority benefit of U.S. Provisional Application Serial No. 60/185,911, filed on Feb. 29, 2000.

TECHNICAL FIELD

The present invention relates generally to coin escrow devices and, more specifically, to a coin escrow mechanism for the temporary storage of coins.

BACKGROUND OF THE INVENTION

In the operation of metered rate pay telephones, it is important to temporarily accept a coin and hold that coin until the pending connection of the attempted phone call is made and the cost of the phone call is determined. The money that is placed into the escrow mechanism is considered to be credit. If the telephone call is not completed, the coins are to be refunded. If the telephone call is completed, then metered pulses from the telephone company's central office are delivered to the phone. The metered pulses are based on time. The length of time for the phone call depends on how much credit (money) the user has placed into the escrow mechanism. When the call is completed the escrow mechanism delivers (or passes) coins to the coin box and can refund any unused balance of the credit. The unused portion of the credit to be refunded would be the remainder of the stored coins after the phone call debit was satisfied. The escrow would not necessarily refund exact change, but rather would refund the best change based on credit usage.

While there are mechanisms known in the prior art for providing a best change escrow mechanism, in general such mechanisms tend to suffer from reliability problems and jamming as a result of having to separate the coins into thick store and thin store holding zones. The known arrangements tend to be somewhat mechanically complex and require complex depot level adjustments. Accordingly, a need yet remains for a best change coin escrow mechanism that is simple, reliable, and resists jamming. It is to the provision of such a "best change" coin escrow apparatus that the present invention is primarily directed.

SUMMARY OF THE INVENTION

Briefly described, in a preferred form the present invention comprises a "best change" coin escrow mechanism for use in a pay telephone. The coin escrow apparatus preferably includes a housing defining a coin storage area, a coin acceptance path, a coin refund path, a coin reject path, a "trash" chute and a coin deposit chute. In more preferred form, the coin escrow apparatus also includes a coin acceptance gate, coin release gate and a coin refund gate mounted within the housing for selective movement while processing coins.

The coin storage area is preferably comprised of a series of toggles that are operated by the kinetic and potential energy of coins. For example, each coin storage area preferably comprises a lower toggle pivotal upon contact with a stored coin, and an upper toggle cooperating with the lower toggle to block passage along the accepted coin path into the coin storage area while the stored coin is retained in the coin storage area.

According to a further preferred form, the coin escrow housing comprises two halves, one of which is pivotally mounted to the other, to allow for ease of cleaning and the easy removal of coin jams.

In another form of the invention, there is provided a method of retaining a plurality of coins in escrow and sequentially releasing the plurality of coins. Generally described, the method comprises the steps of receiving deposited coins and directing the coins along a coin path, storing the coins in a series of coin storage areas along the coin path, with each said coin storage area adapted to retain one of the coins, and sequentially advancing each one of the coins through each of said coin storage areas.

The step of storing the coins in a series of coin storage areas preferably comprises receiving a stored coin into a coin storage area comprising a lower toggle and a cooperating upper toggle, whereby entry of the stored coin into the coin storage area pivots the lower toggle between a first position and a second position, and advances a portion of the upper toggle to block the coin path and prevent advancement of a following coin into the coin storage area. Furthermore, the step of sequentially advancing each one of the coins through each of the coin storage areas preferably comprises releasing the stored coin from the coin storage area, thereby allowing the lower toggle to return to the first position and retracting the upper toggle from the coin path to permit advancement of the following coin into the coin storage area.

The coin escrow apparatus according to the present invention has numerous advantages. Firstly, it is mechanically very simple, rugged, and reliable. Furthermore, the coin escrow apparatus is capable of handling a large dimensional variation in coin sizes without the use of multiple coin paths or complex mechanisms requiring many adjustments to handle various coin sizes.

These and other features and advantages of the present invention will become more apparent upon reading the following description in conjunction with the accompanying drawing figures.

DETAILED DESCRIPTION OF THE PREFERRED EMBODIMENT

Figure 1:
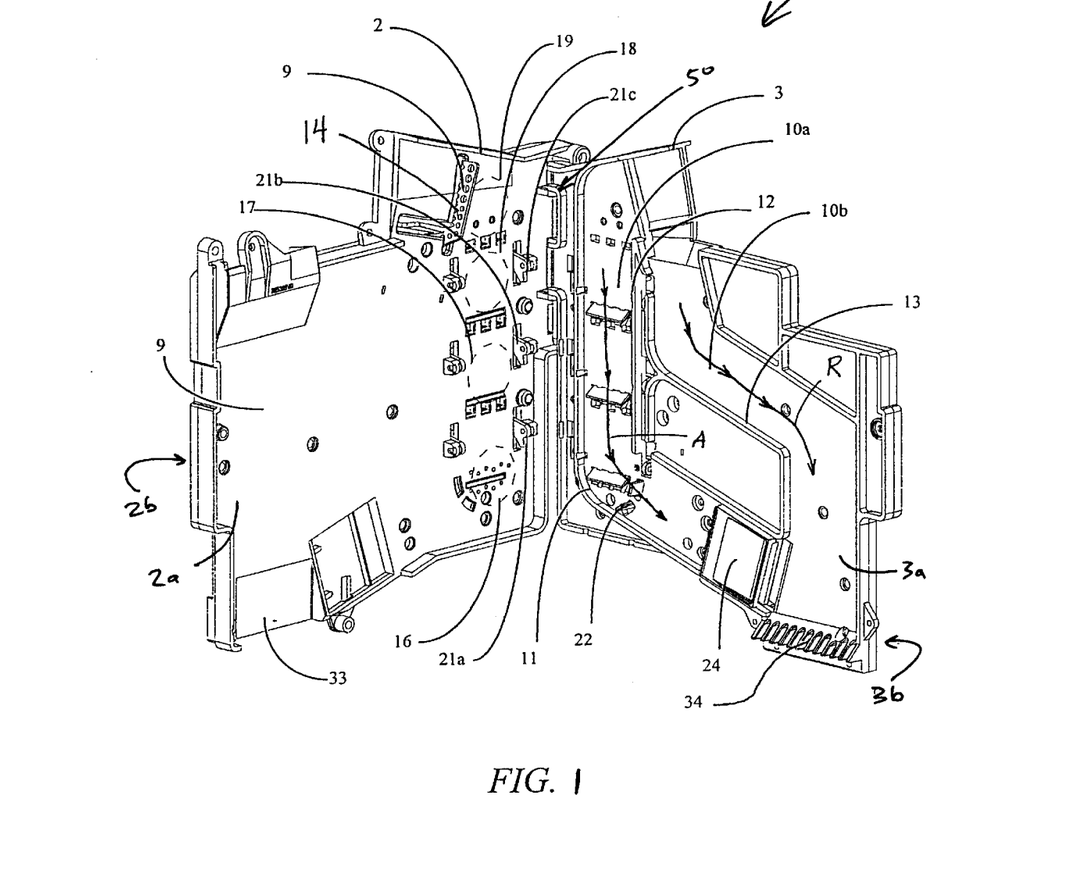
FIG. 1 is a perspective view of a coin escrow apparatus according to a preferred form of the present invention, showing a main side and a pivoting side of the apparatus disposed in a pivoted open position and showing internal paths.
Figure 2:
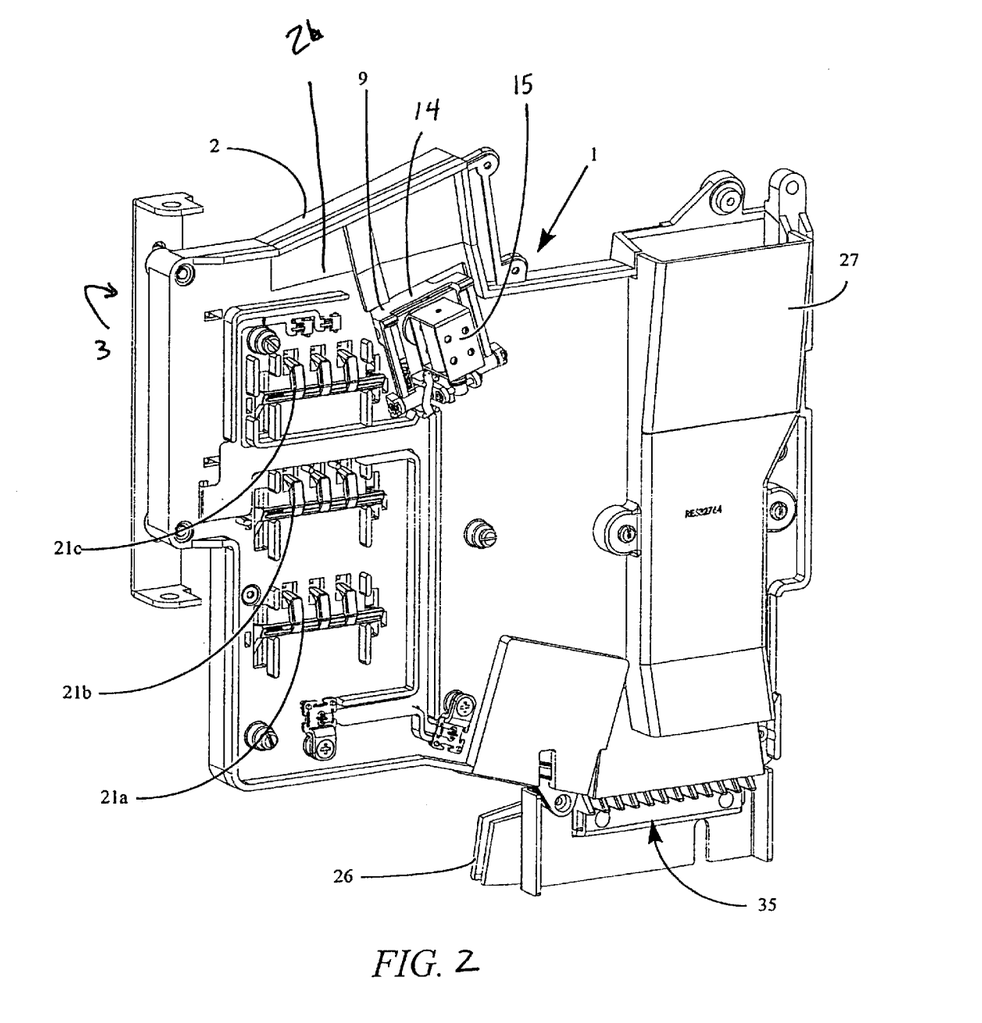
FIG. 2 is a perspective view of the coin escrow apparatus of FIG. 1 in a pivoted closed position, showing certain components on an exterior side of the main frame.
Figure 3:
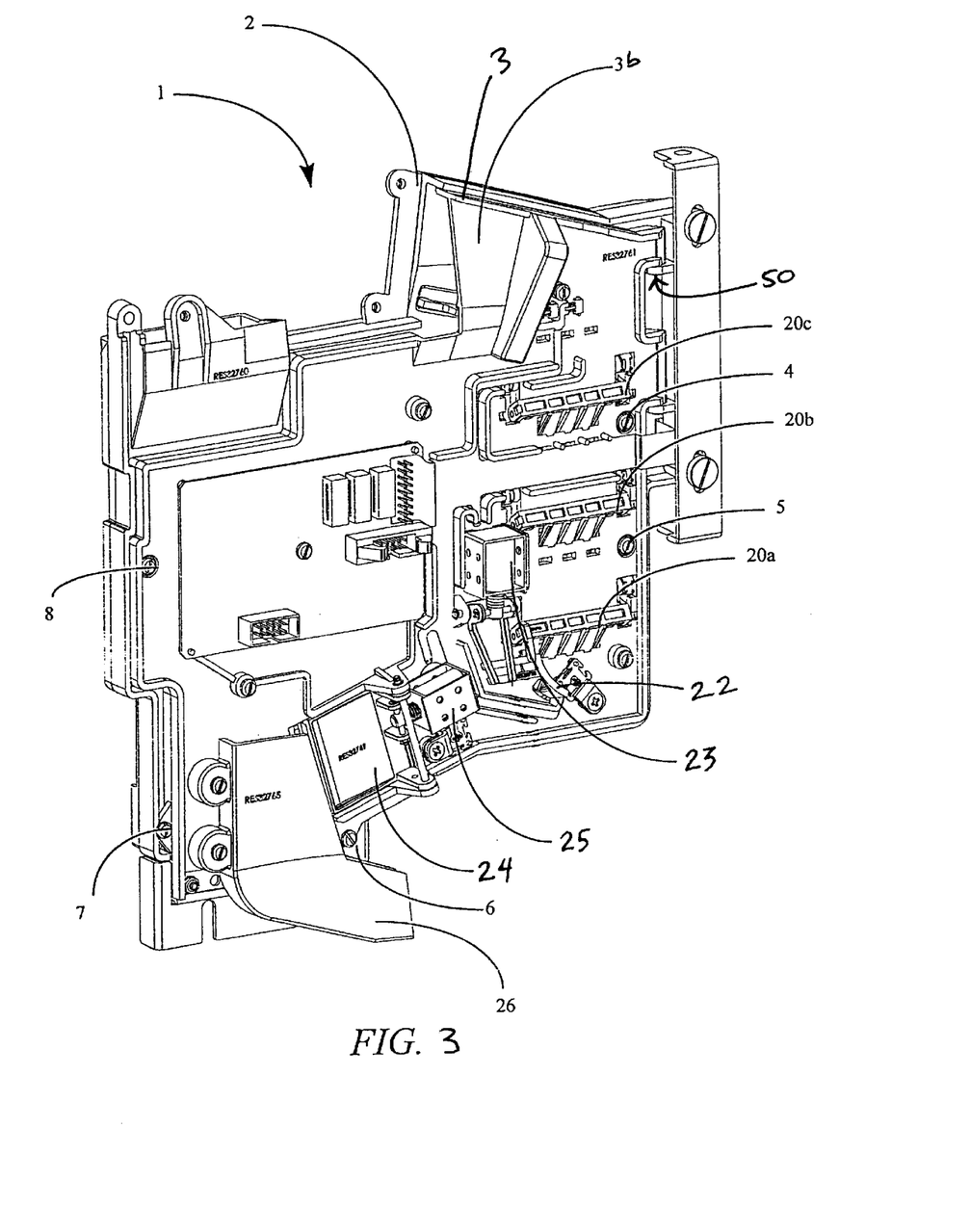
FIG. 3 is a perspective view of the coin escrow apparatus of FIG. 1 in the closed position, showing certain components on an exterior side of the pivoting frame.

Referring now to the drawing figures, wherein like reference numerals represent like parts throughout the several views, FIGS. 1–3 show a preferred embodiment of a coin escrow apparatus 1 according to the present invention. The apparatus 1 preferably includes a main frame 2 and a pivot frame 3 that are pivotally coupled together such as at 50 in a fashion known in the art for permitting the pivoting frame 3 to pivot to an open or closed position relative to the main frame 2. The main frame 2 has an interior surface 2a and an exterior surface 2b, and the pivoting frame has an interior surface 3a and an exterior surface 3b. The frames are preferably secured together by means of captive screws 4, 5, 6, 7 and 8, or other removable fasteners known in the art. When the screws 4–8 are removed, the pivot frame 3 can be pivoted into the open position as shown in FIG. 1 to allow access to the interior of the coin escrow apparatus 1 for cleaning and removing jammed coins. Preferably, at least two internal coin paths are defined on the main frame 2 by control surface 9, and on the pivoting frame 3 by control surfaces 10a and 10b in conjunction with walls 11, 12, and 13.

The apparatus preferably includes an accept gate 14 pivotally mounted to the main frame 2 by a conventional pivotal coupling. A first actuator, for example, solenoid 15, is rigidly mounted to the main frame 2 and is connected to the gate 14. While the accept gate 14 shown has an elongated, scalloped member, it will be understood that the accept gate can be provided by another structure known in the art. Also, the first actuator can be provided by another mechanism, such as a mechanical linkage, an electric motor, a resistor-based device, or another electronic device, including one with a microprocessor, as may be desired in a given application.

The solenoid is controlled by an electronic control board as is commonly provided in pay telephones, or by another control device as may be desired. The control board can control all of the electronic functions of the phone, including the dial tone, keypad functions, display functions, coin validation, and escrow functions. In controlling the escrow functions, the control board can receive metered pulses from the telephone company central office and, based on the number of pulses received, energize the coin escrow mechanism to release the appropriate coins to cash out or refund.

Figure 11:
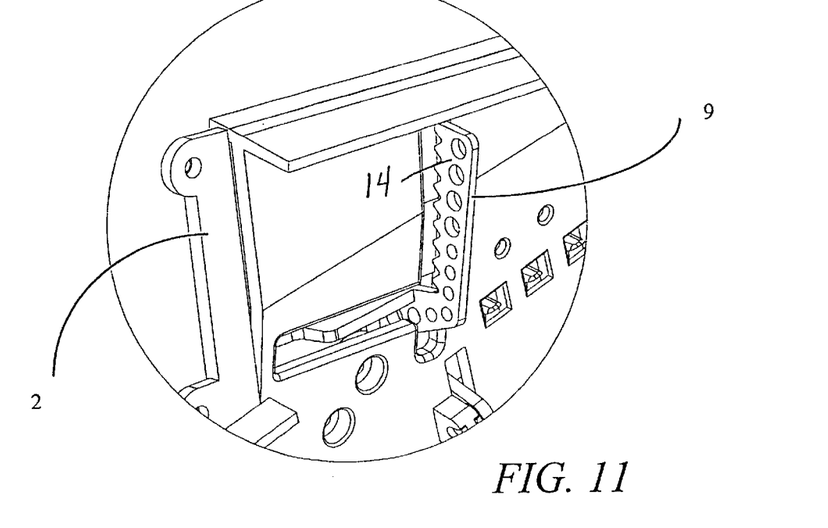
FIG. 11 is a detailed perspective view of an accept gate of the apparatus of FIG. 1, shown in a closed or default position.
Figure 12:
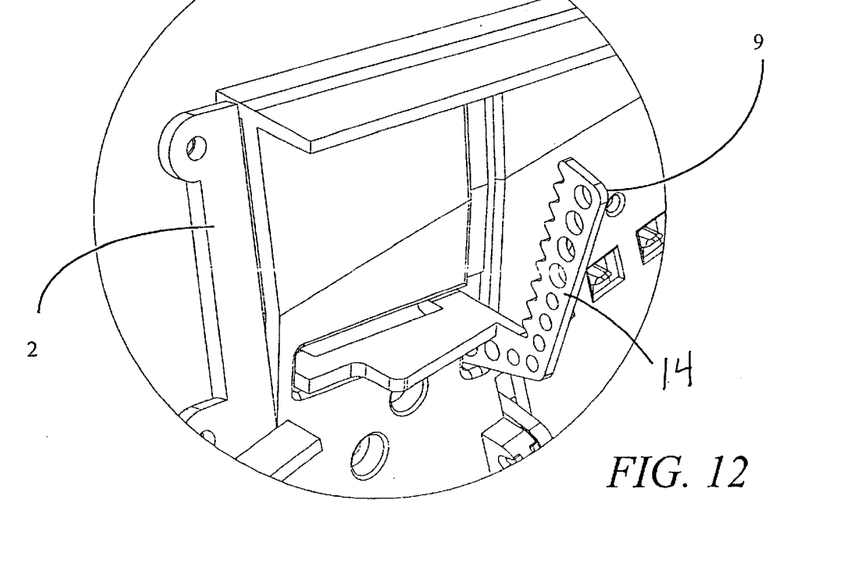
FIG. 12 is a detailed perspective view of the accept gate of the apparatus of FIG. 11, shown in an open or accept coin position.

When energized, the solenoid 15 applies a force to gate 14 causing it to pivot or tilt. FIG. 11 shows the gate 14 in a closed or coin reject position when the solenoid 15 is not energized (the default position). As seen best with reference to FIG. 1, when a coin enters the apparatus 1 with the gate 14 in its default position, the coin is deemed to be rejected and follows the rejected coin path defined by control surface 9, control surface 10b and wall 13, and indicated by reference arrow R. The rejected coin then falls out of the apparatus 1 for return to the customer. FIG. 12 shows the gate 14 in the open or coin accept position with the solenoid 15 energized. When a coin enters the apparatus 1 with the gate 14 in its open or accept position, the coin is accepted and continues along the accepted coin path, indicated by reference arrow A, into coin storage areas 16, 17, 18, and 19 described below.

The apparatus 1 preferably has four coin storage areas, as shown in FIG. 1 and represented by dashed circles 16, 17, 18, and 19. Of course, the apparatus 1 can be provided with fewer or more than four coin storage areas, constructed in similar fashion to those described and depicted in the example embodiment, as appropriate for a given application. The following describes the structure and operation of the coin escrow apparatus as one or more coins are processed through these coin storage areas 16–19.

According to the preferred embodiment, a toggle mechanism is provided including, for example, a series of like lower toggles 20a, 20b, and 20c (collectively, the lower toggles 20) that are pivotally mounted on the main frame 2, and a series of upper toggles 21a, 21b, and 21c (collectively, the upper toggles 21) that are pivotally mounted on the pivot frame 3. Each of the toggles 20 and 21 can be pivotally mounted by conventional pivotal mounting structures known in the art, and are each pivotal between a first or rest position and a second or engaged position. Each lower toggle can have two or another number of arms, with each lowermost toggle additionally having at least one protrusion, and each upper toggle can have at least one finger, that operate as described below with reference to FIGS. 5–8. It will be understood any number of toggles can be provided, and the toggles can have various shapes and sizes selected as may be desired to meet the specific space, strength, usage or other needs of a given application.

Figure 4:
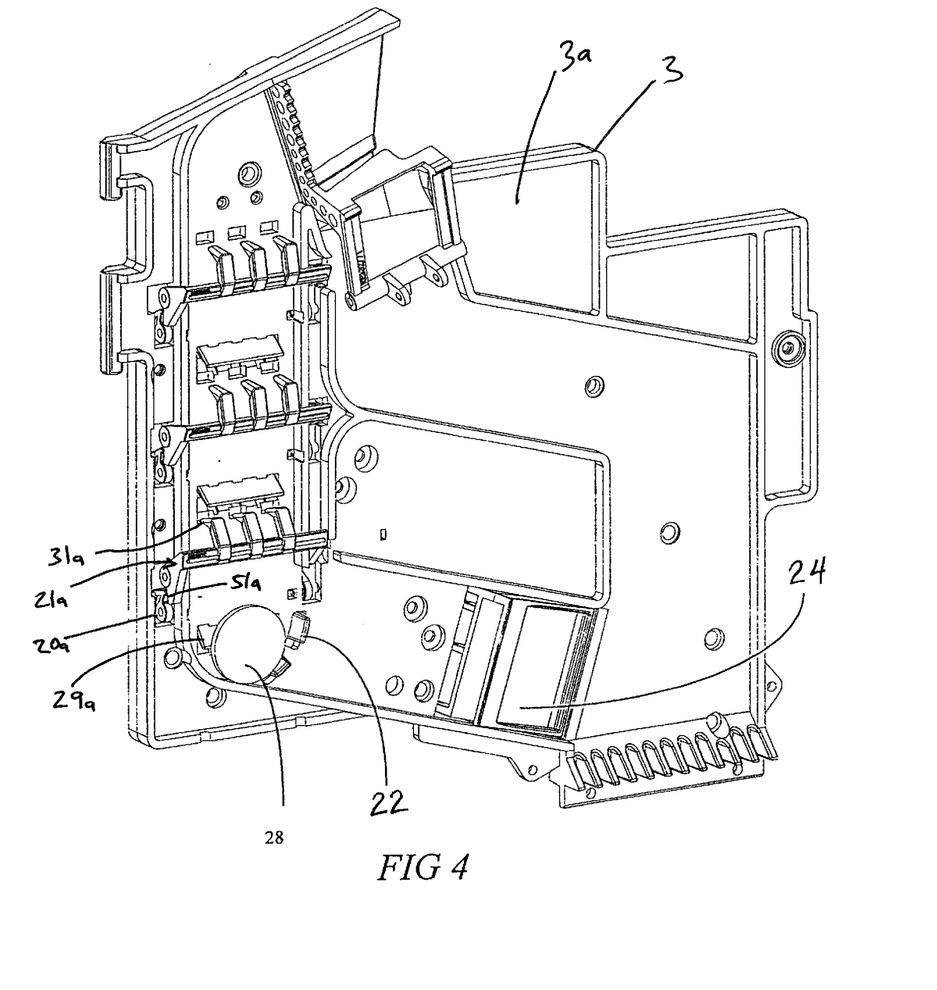
FIG. 4 is a perspective view of the pivoting side of the coin escrow apparatus of FIG. 1, showing an interior surface of the pivoting frame of FIG. 1 with toggles, toggle gates, and a coin in a coin storage area.

Preferably, the toggles are arranged as cooperating pairs of toggles 20a and 21a, 20b and 21b, and 20c and 21c, respectively, to operate in tandem and create the boundaries for the four coin storage areas 16–19. Referring further to FIG. 4, the apparatus 1 preferably further includes a coin release gate 22 pivotally mounted to the pivoting frame 3 by conventional pivotal mounting structures known in the art. While the coin release gate 22 shown has a series of fingers extendable through the frame and configured in a generally semicircular arrangement for supporting the coins, it will be understood that the coin release gate can be provided by another structure known in the art. A second actuator, for example, a solenoid 23, is preferably rigidly mounted to the pivot frame 3 and connected to the release gate 22. Of course, the second actuator can be provided by another mechanism, such as a mechanical linkage, an electric motor, a resistor-based device, or another electronic device, including one with a microprocessor, as may be desired in a given application. The solenoid 23 is energized by the control board of the pay phone based on the number of pulse received, as described above. When the solenoid 23 is energized, a force is applied to the release gate 22 causing it to pivot or tilt.

Figure 5:
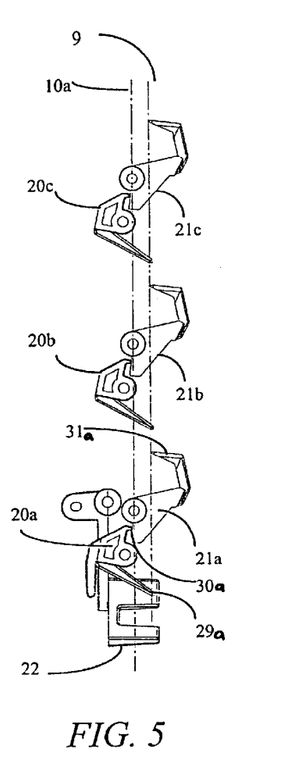
FIG. 5 is a schematic side elevational view of the toggles and gates of the apparatus of FIG. 4 without any coins present in the coin storage area.
Figure 6:
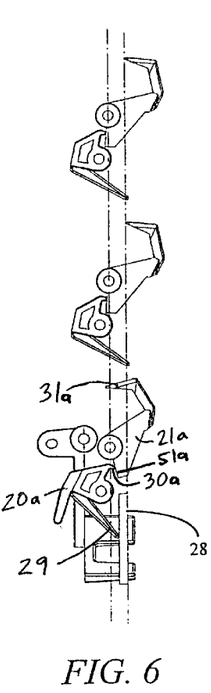
FIG. 6 is a schematic side elevational view of the toggles and gates of the apparatus of FIG. 4 with one coin present in the coin storage area.
Figure 7:
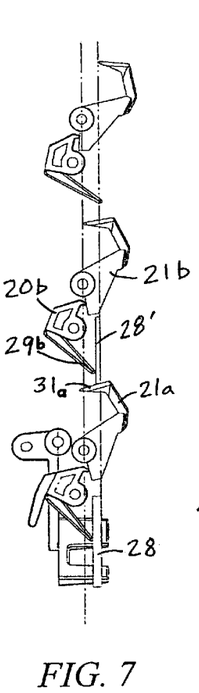
FIG. 7 is a schematic side elevational view of the toggles and gates of the apparatus of FIG. 4 with two coins present in the coin storage area.
Figure 8:
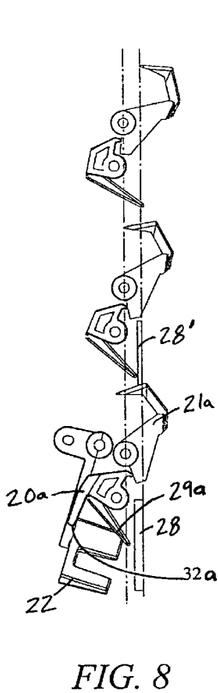
FIG. 8 is a schematic side elevational view of the toggles and toggle gates of the apparatus of FIG. 4 with one coin being released from the coin storage area.

FIGS. 5–8 show details of the operation of the preferred embodiment of the coin escrow apparatus 1 as one or more coins are processed through the coin storage areas 16–19. Control surfaces 9 and 10a are shown as dotted lines for clarity in FIGS. 5–8. FIG. 8 shows the release gate 22 in an open position while the solenoid 23 is energized. FIGS. 5–7 show the release gate 22 in a closed or default position when the solenoid 23 is at rest or non-energized. In FIG. 5, the upper toggles 21a, 21b, 21c and lower toggles 20a, 20b, 20c are shown in rest (first) positions as determined by gravity, without the presence of a coin. The coin release gate 22 is shown at rest in the closed position and forms a barrier that prevents coins from rolling past it. FIG. 4 shows the gate 22 holding a coin 28 in storage area 16. FIG. 6 shows the coin 28 after it has passed through the coin storage areas 17–19. The coin 28 contacts and exerts a force on a first arm 29a of lower toggle 20a, causing the toggle to pivot from the rest or first position to the second or engaged position. When the lower toggle 20a pivots to the second position, a protrusion 30a on the lower toggle contacts and exerts a force on a contact surface 51a defined on the upper toggle 21a. The upper toggle 21a is thereby pivoted into the second position, so that fingers 31a of upper toggle 21a block off the coin path across control surfaces 9 and 10.

Referring to FIG. 7, as a next coin 28' is passed through the coin accept path, it stops on the fingers 31a of upper toggle 21a. The coin contacts and exerts a force on arm 29b of lower toggle 20b causing the upper toggle 21b to pivot to the second position to block the accept path. This process can continue until all coin storage areas 16–19 have coins in them. It is not a requirement of the invention that all the coin storage areas 16–19 be occupied by a coin upon each use, but rather that a preferred embodiment of the system may accommodate a plurality of coins, for example, between 1 and 4 coins, in escrow at any one time.

FIG. 8 shows the coin release gate 22 in its open position to release the single coin 28. As the gate 22 pivots, a second arm 32a of lower toggle 20a has a force exerted on it causing the lower toggle 20a to pivot. The arm 29a of lower toggle 20a releases the coin 28 because the gate 22 removes the block from the coin path. The coin 28 is then free to roll down the coin path toward the refund gate 24. Note that the coin(s) stored in the coin store areas 17–19 remain held in position. As the gate 22 is released (unexercised) the upper toggle 21a and lower toggle 20a return to their rest position and allow the coins 28' above to fall one position in the coin storage areas 16–19.

As described, the coin escrow apparatus 1 of the present invention enables one or more coins to be held temporarily in escrow, and sequentially refunded or credited for payment, one coin at a time. The series of cooperating pairs of lower toggles 20 and upper toggles 21 permit each deposited coin to automatically advance to the next unoccupied coin storage area as coins are sequentially processed, but effectively block the advance of a coin into an occupied coin storage area, thereby preventing or substantially reducing the likelihood of jamming.

Referring back to FIGS. 1–4, the apparatus 1 preferably further includes a coin refund gate 24 pivotally mounted to the pivot frame 3 by a conventional pivotal mounting as is known in the art. A third actuator, such as solenoid 25, is preferably rigidly mounted to the pivoting frame 3. Of course, the third actuator can be provided by another mechanism, such as a mechanical linkage, an electric motor, a resistor-based device, or another electronic device, including one with a microprocessor, as may be desired in a given application.

Figure 9:
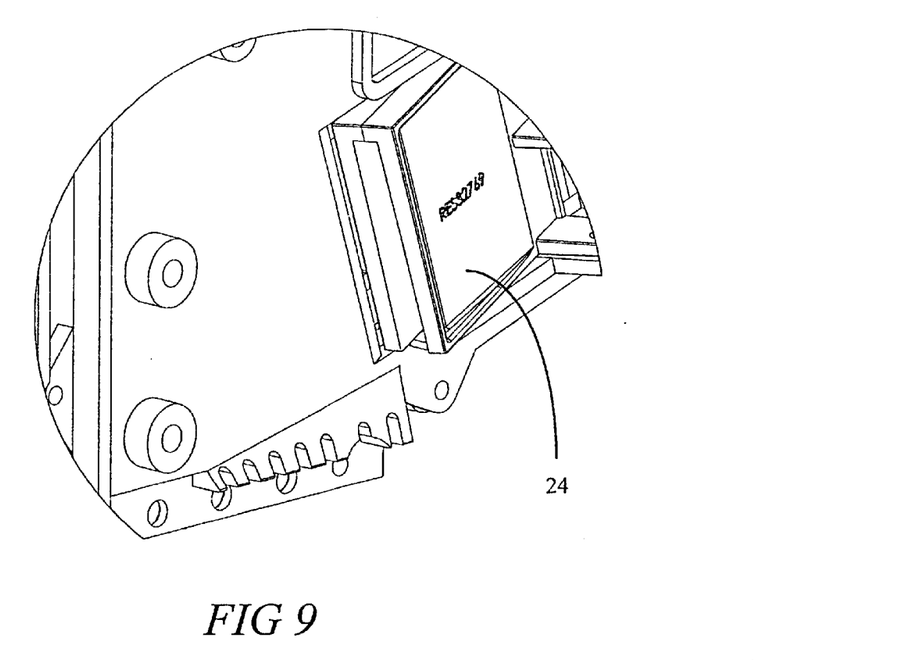
FIG. 9 is a detailed perspective view of a refund gate of the apparatus of FIG. 1, shown in a closed position.
Figure 10:
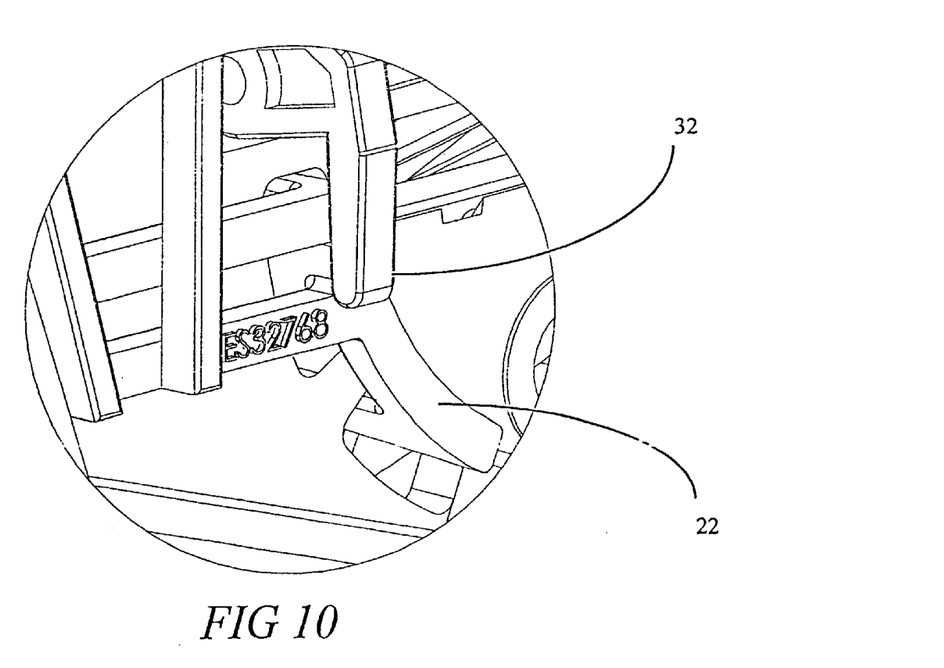
FIG. 10 is a detailed perspective view of a coin release gate of the apparatus of FIG. 1, shown in a closed position.

When the solenoid 25 is energized by the control board, a force is applied to the refund gate 24 causing it to pivot. FIGS. 1 and 3 show the refund gate 24 in an open position when the solenoid 25 is energized. FIGS. 4 and 9 show the refund gate 24 in a closed or default position when the solenoid 25 is at rest or non-energized. As the coin is released from the coin storage area 17 (as described above), the gate 24 will remain in the closed position if the coin is to be sent to a cash compartment within the pay telephone. The pivot frame 3 includes a cash chute 26, which allows the coin to be delivered to a cash compartment as a debit or portion thereof for the phone call, as determined by the number of pulses that are received from the telephone company, as is known in the art. Alternately, if the coin is to be refunded, the solenoid 25 is energized and the refund gate 24 pivots to the refund position.

Referring again to FIGS. 1 and 2, the main frame 2 preferably further comprises a control surface 33. The pivoting frame 3 preferably has one or a series of fingers 34 that, in combination with control surface 10b and control surface 33, form a refund chute 35. When the solenoid 25 is energized, the coin then rolls out to the refund chute 35 and is delivered to a holding area in the pay telephone.

The main frame 2 preferably also includes a rubbish or debris chute 27. The debris chute 27 is positioned below a coin input device on the pay telephone and allows trash, slugs, or other foreign objects to fall through the apparatus 1 without interfering with the coin escrow mechanism 1.

Additionally, the coin escrow apparatus or a similar apparatus can be used in a method of retaining a plurality of coins in escrow and sequentially releasing the plurality of coins. Generally described, the method comprises the steps of receiving the coins, directing the coins in series along a coin path, storing the coins in a series of coin storage areas along the coin path, with each coin storage area having at least one toggle mechanism adapted to retain at least one of the coins, and sequentially advancing each of the coins through each of the coin storage areas.

The step of storing the coins in said series of coin storage areas can comprise providing each toggle mechanism with a lower toggle and a cooperating upper toggle, wherein entry of one of the coins into one of the coin storage area pivots the lower toggle from a first position to a second position, wherein in the second position a portion of the upper toggle blocks the coin path and prevents advancement of one of the subsequent coins into the coin storage area. Also, the step of sequentially advancing each of the coins through the coin storage areas can comprise moving a coin release gate to a second position to release the coin from the coin storage area, wherein the absence of the coin allows the lower toggle to return to the first position which in turn allows the upper toggle to return to the first position retracted from the coin path to permit advancement of the subsequent coin to the coin storage area.

It will be understood that the present invention can be suitably employed in conjunction with other coin operated devices, such as arcade games, food and drink dispensing machines, turnstiles, and so forth. Also, the method of retaining one or a plurality of coins in escrow and sequentially releasing the plurality of coins can be implemented in various other similar devices and in other sequences. Furthermore, the term "a" as used herein is not intended to mean only "one," but instead is intended to mean any number more or less than one.

Accordingly, the coin escrow apparatus according to the present invention provides numerous advantages over the prior art. The toggles and gates provide a simple, rugged, reliable, mechanism for selectively storing and advancing coins. Furthermore, the toggles and gates are capable of handling a large dimensional variation in coin sizes without the use of multiple coin paths or complex mechanisms requiring many adjustments to handle various coin sizes.

While the invention has been described according to a presently preferred embodiment, it will be readily apparent to those of ordinary skill in the art that many additions, modifications, and deletions can be made thereto without departing from the spirit and scope of the invention.

What is claimed is:

1. A coin escrow apparatus for processing at least one coin in a coin operated machine, comprising:

at least one frame having an accepted coin path defined thereon, said accepted coin path having at least one coin storage area; and a toggle mechanism having at least one lower toggle and at least one upper toggle each pivotally coupled to said frame and each associated with one of said coin storage areas, said lower toggle pivotal upon contact with the coin, said upper toggle cooperating with and pivotal in response to pivoting of said lower toggle to block passage of the coin along said accepted coin path, wherein the coin is retained in said coin storage area.

2. The coin escrow apparatus of claim 1, wherein said toggle mechanism comprises a series of cooperating pairs of lower and upper toggles, each pair of lower and upper toggles associated with one of a plurality of said coin storage areas along said accepted coin path.

3. The coin escrow apparatus of claim 2, further comprising at least one coin release gate movable between a closed position blocking said accepted coin path and an open position permitting coin passage along said accepted coin path.

4. The coin escrow apparatus of claim 3, further comprising a reject coin path and an accept gate for selectively directing coins to said accepted coin path or a rejected coin path.

5. The coin escrow apparatus of claim 4, further comprising a coin refund gate that receives coins from said accepted coin path and selectively directs the coins to a cash chute or a refund chute.

6. The coin escrow apparatus of claim 5, further comprising a debris chute bypassing said accepted coin path and said rejected coin path.

7. The coin escrow apparatus of claim 3, further comprising a first actuator that selectively moves said coin release gate between the closed position and the open position.

8. The coin escrow apparatus of claim 7, wherein said actuator comprises at least one solenoid.

9. A coin escrow apparatus for processing at least one coin in a coin operated machine, said apparatus comprising;

a toggle mechanism having at least one pair of cooperating toggles, each pair of toggles comprising at least one lower toggle and at least one upper toggle;

wherein each lower toggle is mounted along a coin path for movement from a lower toggle first position to a lower toggle position second position, said lower toggle comprising an arm for contacting one of the coins traversing said coin path, wherein said contact between said arm and the coin moves said lower toggle from said first position to said second position; and wherein each upper toggle cooperates with said lower toggle and is movable between an upper toggle first position and an upper toggle second position, wherein said upper toggle moves from said upper toggle first position to said upper toggle second position in response to movement of said lower toggle from said lower toggle first position to said lower toggle second position, and wherein a portion of said upper toggle blocks said coin path when said upper toggle is in said second position.

10. The coin escrow apparatus of claim 9, wherein said lower and upper toggles are pivotally mounted along said coin path.

11. A method of retaining a plurality of coins in escrow and sequentially releasing the plurality of coins, said method comprising:

receiving the coins and directing the coins in series along a coin path;

storing the coins in a series of coin storage areas along said coin path, each said coin storage area having at least one toggle mechanism adapted to retain at least one of the coins; and sequentially advancing each of the coins through each of said coin storage areas.

12. The method of claim 11, wherein said step of storing the coins in said series of coin storage areas comprises providing each said toggle mechanism with a lower toggle and a cooperating upper toggle, wherein entry of one of the coins into one of said coin storage area pivots said lower toggle from a first position to a second position, wherein in said second position a portion of said upper toggle blocks said coin path and prevents advancement of one of the subsequent coins into said coin storage area.

13. The method of claim 12, wherein said step of sequentially advancing each of the coins through each said coin storage areas comprises moving a coin release gate to a second position to release the coin from said coin storage area, wherein the absence of the coin allows said lower toggle to return to said first position which in turn allows said upper toggle to return to said first position retracted from said coin path to permit advancement of the subsequent coin to said coin storage area.

* * * * *